March 29, 1966  D. MAY  3,243,212
BALL AND SOCKET JOINT HAVING AN OUTER
RING CRACKED RADIALLY
Filed Nov. 6, 1963

INVENTOR
DIETHELM MAY
BY Hammond & Littell
ATTORNEYS

United States Patent Office 3,243,212
Patented Mar. 29, 1966

3,243,212
BALL AND SOCKET JOINT HAVING AN OUTER RING CRACKED RADIALLY
Diethelm May, Herzogenaurach, near Nurnberg, Germany, assignor to Industriewerk Schaeffler, Herzogenaurach, Germany, a corporation of Germany
Filed Nov. 6, 1963, Ser. No. 321,874
Claims priority, application Germany, Nov. 16, 1962, J 22,665
2 Claims. (Cl. 287—87)

This invention relates to a ball-and-socket joint which consists of an inner ring with a cylindrical bore and a crowned outer surface and an outer ring with a cylindrical outer surface and a bore shaped corresponding to the crowned surface of the inner ring.

Such joints have previously been described in various well known embodiments. The action of these joints is also similar to the action of a bearing over a specific range of movement. The problem connected with such ball-and-socket joints resides in that a special form of the outer ring is required so that the inner ring can be introduced therein to form the complete joint.

For this purpose it has previously been proposed to provide recesses at two diametrically opposed places in the bore of the outer ring, to introduce the inner ring in a position which is displaced by 90° from its operating position, and then rotate it into the operating position. This embodiment has the disadvantage that the recesses in the bore of the outer ring introduce a loss in the load carrying bearing surface.

In addition, such ball-and-socket joints have for a long time been produced by dividing the outer ring at two diametrically opposed locations in a plane which passes through the joint axis to separate the ring into two halves. After the introduction of the inner ring into the two halves of the outer ring, the joint in these known embodiments is assembled into a transportable unit by placing a spring washer of steel wire into an annular groove in the outer jacket of the outer ring. In such joints the outer ring is often initially produced from a single piece of material and is then cleaved into two equal halves. The disadvantage of this embodiment resides in that the danger exists that upon forcing the joint into a housing bore, the two halves of the outer ring are axially displaced with respect to each other by a small amount, so that the crowned surface of the inner ring does not touch the entire surface of the outer ring provided therefor, but instead stresses along the edges of these parts occur. This disadvantage particularly occurs in connection with ball-and-socket joints with relatively large exterior diameters when a tight fit between the outer ring and the bore which is to receive the outer ring is desired. If in such a case the outer ring is alternately driven into the bore by hammer taps on both halves of the ring, such displacements are practically unavoidable. This danger is particularly great in case of those joints where, as indicated above, the outer ring is initially manufactured in a single piece and was then cleaved into two halves. The ruptured surfaces of the two halves of the outer ring are not smooth but for practical purposes form a fine jagged surface. If, upon pressing the outer ring into a bore, the two halves are axially displaced with respect to each other, they are simultaneously fixed with respect to each other in their undesired position by virtue of the fine jaggedness so that they cannot position themselves into the correct position even under a load in operation.

It is therefore, an object of this invention to provide a ball-and-socket joint having the maximum possible bearing surface between inner and outer rings.

A further object is to provide a ball-and-socket joint wherein the entire bearing surface of the inner ring is in contact with the bearing surface of the outer ring.

Another object is to provide a simple method for producing a bell-and-socket joint wherein the inner and outer rings may be easily assembled and subsequent alteration of bearing surface contact is prevented.

A further object is to provide a ball-and-socket joint for use with hydraulically operated assemblies wherein the hydraulic fluid may be passed directly through the joint.

These and other objects of my invention will become apparent as the description thereof proceeds.

According to the present invention, the above disadvantages are overcome and the objects of my invention are attained by dividing the outer ring of such a ball-and-socket joint in a plane which passes through its center and at right angles to the axis of the joint, and by rigidly connecting the two halves of this outer ring by suitable means. This embodiment guarantees a very simple manufacture on the one hand, which does not require any additional cost over the known embodiments. At the same time, however, this embodiment removes all of the shortcomings of the previously known ball-and-socket joints.

In this case it is also advantageous, just as with the known joints, to manufacture and completely finish the outer ring initially in a single piece and only thereafter divide it into two parts by cleavage. The cleavage operation itself may be effected pursuant to known methods, that is, by driving conical spikes into bores in the outer ring.

Finally, it is important to again connect the two parts of the outer ring after installation of the joint in such a way that a transportable unit results. Pursuant to the present invention, this may be accomplished by providing the outer ring on its outer surface with a plurality of annular grooves uniformly distributed over its circumference so that the plug-like portions enclosed by the annular grooves lie in the area of the parting line, the connection of the two parts of the outer ring being effected by rings which are pressed down upon the plug-like parts. Other suitable means of connection can also be used.

Pursuant to a further embodiment of the present invention, the outer and/or inner ring may be provided with one or several radial channels as well as with annular grooves in the area of these channels on the outer and/or inner jacket. These radially directed channels and the annular grooves connected therewith may, for example, be utilized for lubrication of the joint. However, they may also serve a very particular purpose which can be fulfilled only by the joint construction pursuant to the present invention.

It is known that ball-and-socket joints are often used in hydraulically operated assemblies. In such a case it is often necessary to pass the hydraulic fluid which is necessary for operation of these assemblies past the ball-and-socket joint location where the joint is built in. Heretofore this was practically only possible with the aid of hoselines which were located outside of the joint location and therefore very often were exposed to the danger of damage.

The present joint construction now makes it possible to avoid this undesirable construction and to pass the hydraulic fluid directly through the location of the joint. The hydraulic fluid can, for example, be introduced through the shaft which carries the inner ring of the joint and may pass through the radial channels of the inner ring and the outer ring to a bore in the housing which carries the outer ring. However, for this purpose it is necessary that the ball-and-socket joint be provided with packing between the inner ring and the outer ring and also between the inner ring and the housing bore on the other hand. However, such packing is again possible only in connection with a joint construction corresponding to the present invention, because in known constructions packing is made impossible by virtue of the displaced parting line in the outer ring or by the recesses in the bore of the outer ring. The packing within the ball-and-socket joint may be effected pursuant to the present invention by providing annular grooves on both sides of the radial directed channels in the bore of the outer ring or in the outer jacket of the inner ring for receiving packing elements.

Particularly suitable as packing elements for this embodiment have been found to be annular rope packing rings. The packing of the inner ring of the ball-and-socket joint with respect to the shaft or the packing between the outer ring and the bore can also be effected pursuant to the invention by means of rope packing rings which are seated in grooves of the outer and inner rings or in parts receiving the same.

My invention may be better understood by reference to the drawings which represent various embodiments of the above described invention wherein.

Figure 1:
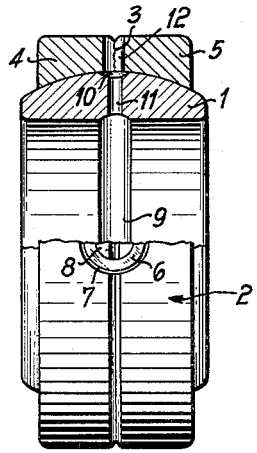
FIG. 1 shows a partial longitudinal cut through a ball-and-socket joint according to the present invention.

Pursuant to FIG. 1, the joint consists of an inner ring 1 and an outer ring 2 which is separated by cleavage along line 3 into the two equal halves 4 and 5. The two halves 4 and 5 of outer ring 2 are held together by a plurality of rings 6, said rings being embedded in annular grooves 7 and are pressed upon the plug-like portions 8, which are uniformly distributed over the outer jacket of the outer ring. Annular grooves are centered on the cleavage line and are formed prior to cleavage preferably.

According to FIG. 1, the inner ring 1 comprises an annular groove 9 in its bore and an annular groove 10 in its outer jacket. A plurality of radially directed channels 11 uniformly distributed over the circumference terminates in these annular grooves 9 and 10. The outer ring 2 comprises channels 12 in like fashion and number.

Figure 2:
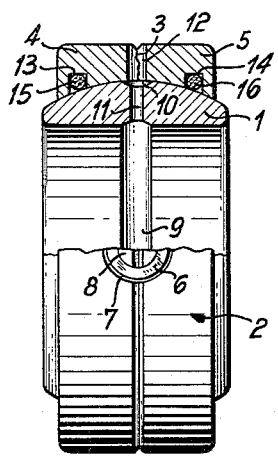
FIG. 2 shows a joint according to FIG. 1 with packing between the inner and outer rings.

FIG. 2 is a similar structure to that in FIG. 1. In FIG. 2, however, the two halves 4 and 5 of outer ring 2 differ from FIG. 1 in that they are provided with annular recesses 13 and 14 in the bore in which rope packing rings 15 and 16 are embedded which cooperate to form a seal with the outer jacket of inner ring 1.

Figure 3:
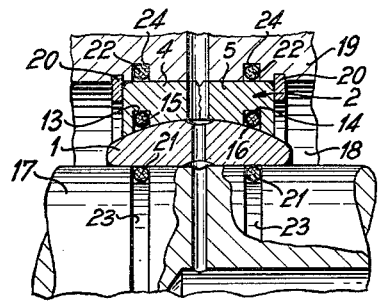
FIGS. 3 to 5 are partial longitudinal cross sections with parts broken away through various embodiments of packed ball-and-socket joints of the invention.
Figure 4:
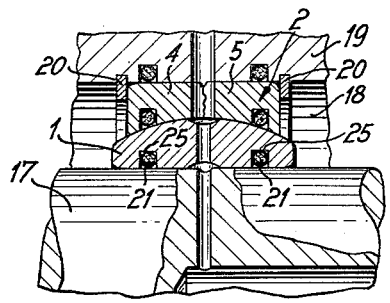
Figure 5:
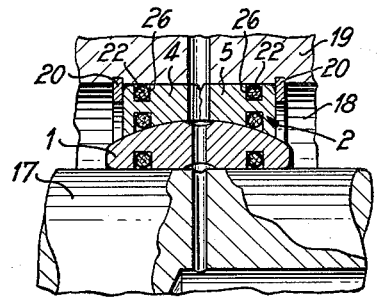

Finally, FIGS. 3 to 5 show various embodiments for packed ball-and-socket joints. In all cases the inner ring 1 is supported by a shaft 17, while the outer ring 2 is pressed into a bore 18 of an element 19. The outer ring 2 is axially fixed by spring washers 20. The joint used in FIG. 3 corresponds in its structure completely to that shown in FIG. 2, that is, the seal between the inner ring 1 and elements 4 and 5 of the outer ring is effected by the annular rope sealing rings 15 and 16 which are seated in annular grooves 13 and 14 of the outer ring.

The seal of the inner ring 1 with respect to shaft 17 and of parts 4 and 5 of the outer ring 2 with respect to bore 18 is also effected in this embodiment by means of rope sealing rings 21 and 22, which are seated in annular grooves 23 on shaft 17 or in grooves 24 in bore 18.

The embodiment shown in FIG. 4 is basically the same as in FIG. 3. The only difference is that the rope rings 21 which are used to form the seal between the inner ring 1 and shaft 17 are not seated in annular grooves in shaft 17 but rather in annular grooves 25 which are located in the bore of inner ring 1.

Finally, FIG. 5 shows a variation of FIG. 4 wherein the rope seal rings 22 used for establishing the seal between parts 4 and 5 of the outer ring 2 and bore 18 are seated in annular grooves 26 which are located directly in the outer jacket of parts 4 and 5.

In place of rope sealing rings, any other suitable sealing rings may be used as well known in the art.

While I have recited certain specific embodiments and preferred modes of practice of my invention, it will be understood that this is solely for the purpose of illustrating the invention to persons skilled in the art. Various changes and modifications may be made in the invention without departing from the spirit of the disclosure or the scope of the appended claims.

I claim:

1. A ball-and-socket joint comprising an inner member having a crowned outer surface and an outer member having a bore shaped to fit the crowned surface of the inner member, said outer member being comprised of two substantially equal halves having a plane of separation perpendicular to the bore axis, the interfaces of said two halves being matching irregular cleavage surfaces along said plane, and means to rigidly connect said two halves of the outer member with said matching cleavage surfaces in contact, said ball-and-socket joint having maximum bearing surface contact between said inner and outer members and said outer member being insertable into a housing bore without displacement of its two halves.

2. The ball-and-socket joint of claim 1 comprising in addition channel and seal means for lubrication of said joint.

References Cited by the Examiner
UNITED STATES PATENTS

| | | | |
|---|---|---|---|
| 102,703 | 5/1870 | Pease | 287—87 |
| 783,301 | 2/1905 | McMillan | 285—160 |
| 1,300,023 | 4/1919 | Riegel. | |
| 1,734,244 | 11/1929 | Bingman | 287—87 |
| 1,983,368 | 12/1934 | Hathorn | 287—88 |
| 2,365,552 | 12/1944 | Hill. | |
| 2,421,691 | 6/1947 | Gibson et al. | 287—87 |
| 2,511,495 | 6/1950 | Crot | 285—190 |
| 2,681,259 | 6/1954 | White | 308—72 |
| 2,701,409 | 2/1955 | Heim | 29—149.5 |
| 2,733,085 | 1/1956 | Latzen | 287—87 |
| 2,758,365 | 8/1956 | Ricefield | 29—149.5 |
| 2,910,260 | 10/1959 | Tanner | 287—87 |
| 2,973,980 | 3/1961 | Vogt et al. | 287—87 |
| 2,995,813 | 8/1961 | Board | 29—149.5 X |
| 3,160,430 | 12/1964 | Gottschald | 287—87 |

CARL W. TOMLIN, *Primary Examiner.*

I. B. TALTON, T. F. CALLAGHAN,
*Assistant Examiners.*